June 5, 1934.  P. P. BOWEN  1,961,921
SCREEN SEPARATOR
Filed Feb. 15, 1930
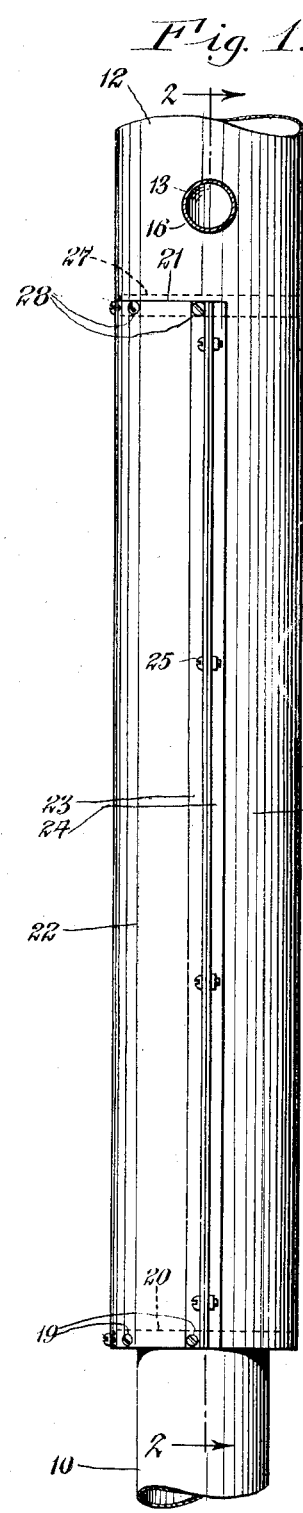
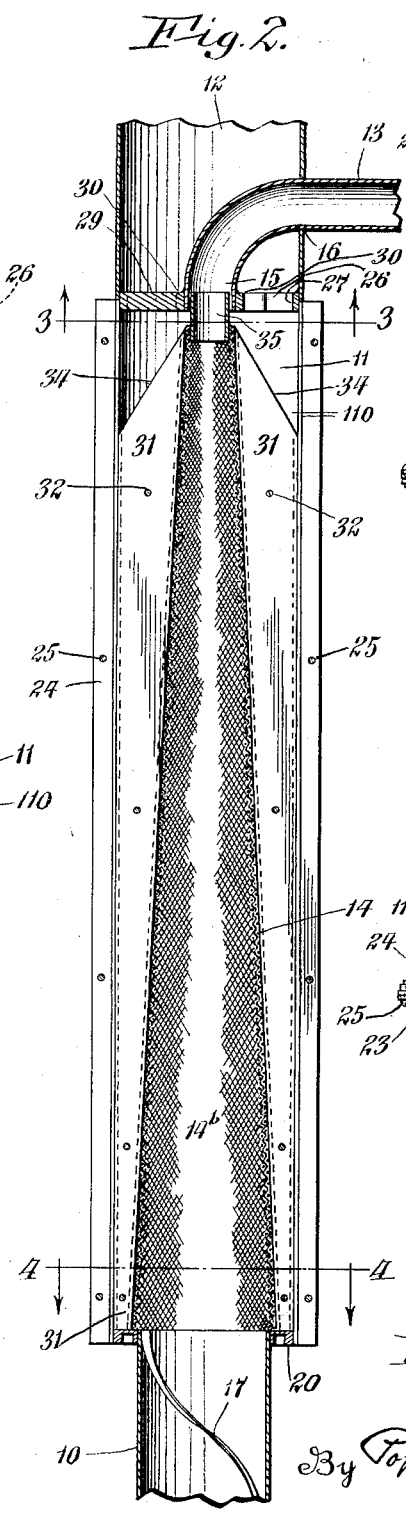
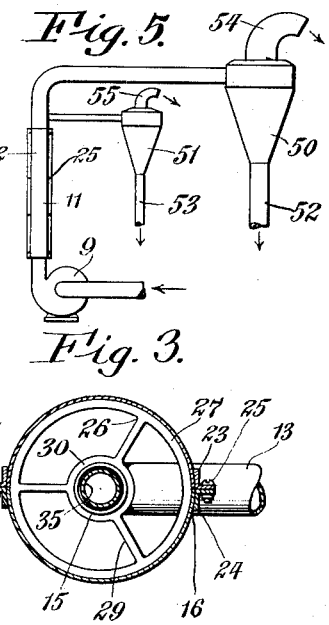
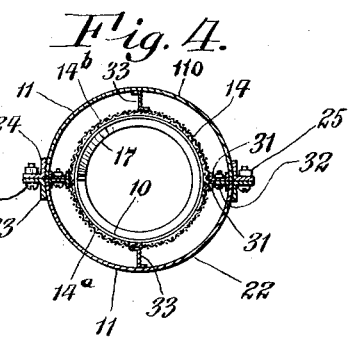
Inventor
Percy P. Bowen
By Popper Powers
Attorneys Patented June 5, 1934

1,961,921

UNITED STATES PATENT OFFICE 1,961,921

SCREEN SEPARATOR

Percy P. Bowen, North Tonawanda, N. Y.

Application February 15, 1930, Serial No. 428,613

2 Claims. (Cl. 209—250)

This invention relates to a device for separating coarse material from fine material and, in particular, relates to the screen separation of relatively coarse sawdust from very fine sawdust, the two sizes of sawdust being originally suspended or entrained in a current of air.

One of the objects of the invention is to provide a separator of this character which will not clog up under normal operating conditions but which, if it does clog up, may be readily put into operation again. A further object of the invention is to provide a straight-flow screen separator which will offer a minimum of resistance to the flow of the air and solid particles through the separator and which may be installed without necessitating a complicated piping arrangement. A still further object of the invention is to provide a form of screen which may be easily replaced when worn out.

In the accompanying drawing:—

Figure 1 is a side elevation of the improved screen separator.

Figure 2 is a vertical, longitudinal, medial section thereof taken on line 2—2 of Figure 1.

Figures 3 and 4 are horizontal, transverse sections thereof taken on correspondingly numbered lines of Figure 2.

Figure 5 is a front elevation on a reduced scale of the screen separator showing same as used in a typical installation with a blower and a pair of cyclones.

In general, a mixture of air with fine and coarse sawdust or other solid material is blown through a vertical admission pipe or inlet duct 10 into a vertical separator chamber 11 where the coarse and fine material is screen separated, the fine material (suspended in air) being discharged through a fine material discharge duct 12 while the coarse material (also suspended in air) is discharged through a coarse material discharge duct 13.

The actual separating or screening is effected by a long and very slightly tapering, conical screen 14 whose length is more than twice its greater diameter and which is disposed coaxially within the bore of said vertical separator chamber 11. At its lower or large end, said conical screen communicates with the aforesaid inlet duct 10. The upper or small end of said conical screen communicates with the bore of the coarse material discharge duct 13 whose lower end at 15 is in axial alignment with said conical screen, while its upper end is bent in an easy curve through 90° and passes horizontally and laterally at 16 through the wall of the fine material discharge duct 12.

Secured by soldering or otherwise to the inner wall of the inlet duct 10 is a deflector in the shape of a helical rib or spiral vane 17 which projects only a small distance inwardly into the path of the mixed air and solid material passing through said inlet duct, and thereby does not materially retard the flow therethrough. The pitch and the length and depth of fin of said spiral vane 17 are just sufficient to give a slight swirling movement to the mixture. This results in a relatively slight centrifugal action, which results in throwing the solid material laterally outward, while the air in the mixture remains in the central part of the bore of said inlet duct. Thus, as the whole mixture flows upwardly, the solid material is brought immediately into contact with the extreme lower or large end of the conical screen. The fine particles of solid material pass directly through the mesh of said conical screen whereas the coarser, larger particles are repeatedly rolled upon and against the inner face of said screen. This action prevents clogging of the screen by keeping the mesh of said screen constantly cleaned off and open due to the constant brushing away of any particles which may become temporarily lodged upon its inner surface. This action also by reason of the rapid and forcible rolling around of the coarse particles of solid material, operates to brush off all the fine particles which may have been adhering to said coarse particles. These brushed off fine particles are thus enabled also to pass out through the mesh of the screen together with the rest of the fine particles and with the main body of air, straight up and then out through the fine material discharge duct 12 aforementioned.

It should be noted that this movement of the main body of air and fine particles is practically a straight line flow, the movement being directly vertically upward except for the slight deviation incident to their passing through the screen itself. The taper of said conical screen is however so slight and its length so great (over twice its large diameter), that said screen offers relatively little resistance to this vertical upward flow. It should also be noted that the spiral movement given to the flow of air and solid material is relatively slight and only sufficient to effect the desired cleaning and thorough screening effect without excessive resistance. The screen separators at present in general use have a very excessive amount of swirling action which requires a very wide mouthed screen, which, if reasonably compact, must be so constructed as to have a very steep conical taper which in practice has been found to frequently clog up solid. Such a relatively wide mouthed screen construction also requires that the air and solid material change from a horizontal to a vertical direction upon entering the separator, and this also causes unnecessary resistance. In addition, such a construction requires a relatively complicated piping arrangement, whereas in the present improved separator, the main flow is straight up and through the separator chamber 11. If said conical screen should become clogged, it is ordinarily only necessary to stop the blower fan 9 or otherwise stop the flow through the inlet duct 10, whereupon the layer of material which has become packed against the inner surface of the conical screen 14 is allowed to fall freely down and away from the inner surface of said screen under the influence of gravity. This action is due to the fact that the screen is both vertical and conical and has its small end positioned above its large end.

As we have seen, the coarse particles of solid material are repeatedly rolled around and at the same time are moved upwardly along the inner surface of the conical screen until they have been entirely freed of all their small clinging particles. Arriving at the top of said screen, they pass out through the coarse material discharge duct 13 together with a sufficient quantity of air to effect their free flow. In the usual commercial installation of this screen separator, the two discharge pipes 12 and 13 are tubularly connected to suitable centrifugal collectors or cyclones 50 and 51 respectively, in which the entrained solid material is separated out from the air, and dropped into pipes 52 and 53 respectively and the waste air discharged through pipes 54 and 55 respectively.

After continued use, the conical screen 14 wears out and requires being entirely removed from the separator compartment 11 and replaced. Also said screen might possibly become so solidly clogged up as to require being removed for purposes of cleaning. In existing separators, such a screen removal operation can only be effected with considerable difficulty, requiring that the main pipe connections be first uncoupled. In the present invention, the removal of the screen is very simple, the construction to this end being organized as follows:

The main separator chamber 11 and the fine material discharge duct 12 are preferably made in the form of a single metal pipe, the lower extremity of the ultimately fixed, half wall 110 of which is spot welded or otherwise secured to a spacing ring or bushing, or adapting head 20 The latter in turn encloses and is connected to the periphery of the upper end of the inlet duct 10. At the upper or opposite end of the separator chamber 11, the metal pipe of which it is constituted is at 21 cut horizontally and transversely half way through and then slit longitudinally on its opposite sides down to the lower end of said separator chamber 11. This cuts off longitudinally half of the wall of said separator chamber, the part which is cut off being adapted to be used as a cover 22, the opposite longitudinal edges of which are preferably provided with clamping flanges 23 which may, as shown, be constructed of suitable angle iron spot welded thereto. Similar angle irons are spot welded or otherwise secured to the adjacent longitudinal edges of the fixed, half wall 110 of said separator chamber 11 to form fixed clamping flanges 24. A detachable connection between the cover 22 and said fixed, half wall 110 is effected by means of clamping bolts 25 or other suitable means for clamping together said clamping flanges 23 and 24. The lower curved or arcuate end of the cover 22 may additionally be secured in place by means of horizontal cap screws 19 which pass through suitable holes in the lower edge of said cover 22 and are threaded radially into the aforesaid adapting head 20. It will be noted that the whole construction is such that the joint at all points between the cover 22 and the fixed half wall 110 of separator chamber 11 is practically air tight.

An upper wheel-shaped head or spider 26 (see Figs. 1, 2 and 3), provided with a relatively wide rim 27, is spot welded or otherwise secured to the metal pipe which constitutes the combined fine material discharge duct 12 and the fixed half wall 110 of the separator chamber 11, the rim 27 of said spider overlapping the upper edge of said cover and forming a support therefor. The separator chamber cover 22 is secured at its upper edge to this spider by cap screws 28 which pass horizontally through suitable holes in said cover and are radially threaded into the rim 27 of said spider 26. The central part or hub 30 of said spider is bored out to receive the lower end 15 of the coarse material discharge duct 13 to which it may be rigidly secured. Said spider 26 is provided with radial spokes 29 extending inwardly from the rim 27 to the hub 30 of said spider, the open space between said spokes 29 allowing the mixture of air and suspended fine solid material to pass freely therethrough into the fine-material discharge duct 12.

The conical screen 14 is constituted of two identical screen sections 14a and 14b constructed of wire mesh screening, the joint between said sections being in a plane passing through the axis of the screen. Said screen sections are provided at their opposite longitudinal edges with channel shaped clamping flanges 31 which are secured thereto by soldering or otherwise. As seen in Figure 2 the depth or horizontal radial dimensions of each of the said clamping flanges 31 is relatively small at its lower end but relatively large at its upper end so as to properly span the varying depth or space between the outside face of the screen 14 and the wall of the separator chamber 11. The screen sections are detachably held together by suitable bolts 32 which pass through the webs of said clamping flanges 31. With the screen 14 placed so that the flanges 31 cover the longitudinal joints between the cover 22 and fixed wall 110 of the separating chamber 11, as in Figures 2 and 4, it is evident that these flanges 31 additionally frustrate any possible leakage through the joint between the cover 22 and the fixed chamber wall 110, in addition to the resistance caused by the clamping flanges 23 and 24 of said fixed chamber wall 110 of the cover 22 respectively. These clamping flanges 31 of the conical screen (see Figs. 2 and 4) also serve to stiffen and to centralize said screen as a whole. Further stiffening of said screen and the further required adequate centralization in all directions of said screen is provided by the use of Z shaped spacers 33, one of the same being soldered or otherwise secured to the outer face of each screen section 14a and 14b intermediately of its two clamping flanges 31. The soldering of one of said spacers 33 and two of said clamping flanges 31 to each of said screen sections is considerably facilitated by reason of the fact that the sections are detachable from each other upon removal of clamping bolts 32. In practice, the removal of each of said screen sections from its clamping flanges 31 and spacer 33 is effected by applying a soldering iron to the inside of the respective screen section and moving said soldering iron longitudinally in juxtaposition to the inside face of the respective spacer 33 or flange 31 being removed. The same general process is of course followed in soldering the parts together except that in such case the parts are held together and solder supplied. This construction greatly facilitates the replacing of worn out screen sections.

The said spacers 33 and clamping flanges 31 are preferably beveled off at their upper ends at 34 (as shown in Fig. 2) so as to cut down resistance to the flow of the air and fine material passing in this vicinity through the spider 26. A short, leak-eliminating nipple 35 is soldered to the narrow or upper end of one of the screen sections (for instance 14b), said nipple being adapted to fit rather loosely at its outer end within the bore of the central part 15 of the coarse material discharge duct 13. This nipple 35 provides a sufficiently circuitous path between the bore of the conical screen 14 and the upper end of the separator chamber 11 to prevent any appreciable leakage of air and solid material at this point and without necessitating the use of any packing for this purpose. By this construction, any solid matter becoming lodged between said nipple 35 and the bore of the coarse material discharge duct 13 is easily and automatically pushed longitudinally out of place, whereas a washer or other transverse surface would require cleaning off before putting the screen in place.

In removing the screen 14 from the separator chamber 11, the cover bolts 25 and the cover machine screws 19 and 28 are first unscrewed. Then the cover 22 is removed and the lower part of said screen is grasped by its spacers 33 and moved outwardly until its said lower part is clear of the separator chamber 11. The whole screen is then moved downwardly to pull the nipple 35 out from the discharge duct 13. If one of the screen sections 14a or 14b requires replacement, the screen bolts 32 are taken out, the old screen is removed and a new one is then soldered to its respective clamping flanges 31 and spacer 33. To replace the screen, the reverse process is followed.

From the foregoing detailed description of the present invention, the advantages and superiority of the same may now be summarized: The principal feature of the invention is that in actual practice it operates for very prolonged periods without clogging up, and is superior in this respect to any other screen separator. This results from: A. the high velocity through the screen which is due to the fact that the large diameter of the screen 14 is approximately the same as the diameter of the inlet duct 10 with no speed-reducing, enlarged chambers to slow up the velocity just before coming in contact with the screen, B. the extreme length of said screen which preferably has a length approximately eight times the greatest diameter of the screen for ordinary material; and, in any case, should have a length at least more than twice the greater diameter, C. the straight line flow of the fine material into, through and out of the screen, and D. the just sufficient but not excessive swirl given to the mixture just before it strikes against the larger end of the screen.

In addition, the construction is such that the separator can be easily taken apart and cleaned out, inspected or repaired, without requiring dismantling the separator from any part of the piping line to which it is connected. Furthermore, the screen sections 14a and 14b are very easily repaired if they become cut or worn through.

The invention contemplates the screen separation of anything that can be screened, including fibrous and flocculent material; colloids and emulsions; materials of either a coarse or fine, or a soft or a gritty nature; and in fact any more or less rigid solids in any mixture in which part of the material may be retained by a screen and the rest of the material passed through.

I claim as my invention:

1. A screen separator comprising a straight cylindrical separator chamber; a conical screen arranged coaxially therein; an inlet duct communicating with the large end of said conical screen and arranged coaxially therewith; a fine material discharge duct connected to said separator and arranged coaxially therewith; a spiral vane arranged in said inlet duct; and a coarse material discharge duct communicating with the small end of said conical screen.

2. A screen separator comprising an annular separator chamber having a cover closing an opening in one side thereof; an inlet duct and a coarse material discharge duct connected with opposite ends of said chamber and in axial alignment therewith; a conical screen normally positioned in axial alignment within said chamber and having its small end uppermost; a coarse material discharge duct communicating with the upper small end of said conical screen; a spiral vane arranged in said inlet duct; and means for stopping the flow through said inlet duct.

PERCY P. BOWEN.